United States Patent [19] [11] 4,370,263
Visca [45] Jan. 25, 1983

[54] CATALYST FOR THE PHOTO-DECOMPOSITION OF WATER AND PROCESS FOR THE PREPARATION OF THE CATALYST

[75] Inventor: Mario Visca, Alessandria, Italy
[73] Assignee: Sibit, S.p.A., Milan, Italy
[21] Appl. No.: 278,357
[22] Filed: Jun. 29, 1981
[30] Foreign Application Priority Data
Jun. 30, 1980 [IT] Italy .............................. 23123 A/80
Nov. 7, 1980 [IT] Italy .............................. 25828 A/80
[51] Int. Cl.$^3$ ........................ B01J 21/06; B01J 23/20; B01J 23/46
[52] U.S. Cl. .................................................. 252/472
[58] Field of Search .......................... 252/472; 423/657

[56] References Cited
U.S. PATENT DOCUMENTS
3,922,235 11/1975 DeLuca et al. ..................... 252/472
3,939,257 2/1976 Pangborn et al. .............. 423/657 X Primary Examiner—W. J. Shine

[57] ABSTRACT

The present invention concerns a catalyst for the photo-decomposition of water. Said catalyst consists of particles of $TiO_2$ doped with Nb, said particles containing $RuO_2$ on their surface. This catalyst may be used, for instance, in combination with ruthenium trisbipyridyl, methylviologen and colloidal platinum.

7 Claims, No Drawings

CATALYST FOR THE PHOTO-DECOMPOSITION OF WATER AND PROCESS FOR THE PREPARATION OF THE CATALYST

BACKGROUND OF THE INVENTION

The decomposition of water by the action of solar energy is known. This decomposition is based on the formation, in an aqueous solution, by radiation with visible light, of activated complexes of a redox system capable of reacting on suitable catalysts in order to yield $H_2$ and $O_2$.

Thus, for instance, there is known the photooxidation of water by means of $Fe^{3+}$ and quinone in the presence of ZnO, $TiO_2$ and $WO_3$.

Another reaction, used for photo-chemically decomposing water, foresees the use, in the presence of Pt and $RuO_2$ colloidal catalysts, of a redox system formed of ruthenium trisbipyridyl and methylviologen (N,N'-dimethylbipyridine).

More precisely, the system works in the following way: the ruthenium trisbipyridyl, in its reduced form $Ru(bipi)_3^{2+}$, reduces the methylviologen $MV^{2+}$ under the action of visible light, thereby obtaining:
- (1st) the reduced $MV^+$ which reduces the water to $H_2$ on catalyst Pt, regenerating $MV^{2+}$;
- (2nd) the oxidized $Ru(Bipi)_3^{3+}$ which oxidizes the water to $O_2$ on catalyst $RuO_2$, thereby regenerating $Ru(bipi)_3^{2+}$.

The yields in $H_2$ and $O_2$, obtained through this method, are very low.

Furthermore, it is known to use a ruthenium trisbipyridyl-methylviologen redox system in the presence of a catalyst of colloidal platinum and EDTA (ethyldiaminetetraacetic acid).

The EDTA is oxidized by the oxidized form of ruthenium trisbipyridyl, wherefore only $H_2$ is formed, with a yield that is greater than that obtained using the redox system formed of ruthenium trisbipyridyl and methylviologen in the presence of Pt and $RuO_2$ colloidal catalysts, but still rather low.

THE PRESENT INVENTION

One object of this invention is to provide a new catalyst for the photodecomposition of water that will ensure high decomposition yields.

Still another object is to provide a new catalyst which will allow to achieve the photodecomposition of water either by means of a simplified redox system or in the absence of a redox system.

These and other objects are attained by the catalyst for the photodecomposition of water according to this invention, said catalyst consisting of $TiO_2$ containing Nb and Ru.

The niobium is inside the $TiO_2$ particles and acts as a doping substance, while the ruthenium is present on the surface of the $TiO_2$ particles in the form of $RuO_2$.

The catalyst of this invention is thus characterized in that it consists of particles of $TiO_2$ doped with Nb, and containing $RuO_2$ on their surface.

The quantity of ruthenium oxide contained in the catalyst in general is comprised between 0.001% and 10% by weight, calculated as $RuO_2$ on the $TiO_2$; preferably, it is comprised between 0.02% and 2% by weight.

The quantity of niobium contained in the catalyst, in general, is comprised between 0.001% and 10% by weight, calculated as $Nb_2O_5$ on the $TiO_2$, but preferably is comprised between 0.1 and 3% b.w.

The $TiO_2$ may be used in the amorphous form, either as $TiO_2$ or as metatitanic acid (titanium dioxide hydrate) or in the crystalline form (rutile or anatase). The two crystalline forms may be present contemporaneously. The $TiO_2$ may also consist of a product partially amorphous and partially crystalline.

The $TiO_2$ particles may have a size comprised between 50 Å and 10 micron, but preferably the size is comprised between 50 Å and 10,000 Å.

These particle sizes are referred to the particles in a dispersion, either in an aggregated form or as single particles.

The catalyst of this invention may be prepared by different methods.

In one method, to a solution of $TiOSO_4$ and $FeSO_4$ (coming from the sulphuric digestion of ilmenite or other titaniferous materials, e.g., slags from metallurgic processes which use ilmenite for producing iron) there is added a pentavalent niobium compound, soluble in said solution, for instance $Nb_2O_5$, $NbCl_5$ or sodium niobate in the desired quantity. Subsequently, the solution is heated to a temperature comprised between 90° C. and the boiling temperature (preferably comprised between 96° and 108° C.) and is then diluted with water, while keeping the temperature constant until achieving the complete hydrolysis, according to the Blumenfeld method (see, e.g., K. Barksdale, "Titanium", Ronald Press, New York 1966, page 278 and following). The metatitanic acid slurry containing Nb is then filtered and washed.

To the filtration cake, there is added a solution of a water soluble ruthenium salt, for instance $RuCl_3$, in the desired quantity.

Subsequently, the product thus obtained is dried under vacuum, for instance under a vacuum of 300 mmHg, operating for instance at 110° C. Preferably, the dried product is then heated in the air, at e.g., 80°–120° C.

By this method of preparation one obtains a partially amorphous product whose microcrystalline phase is anatase.

Another method of preparation consists, for instance, is converting the Nb-containing metatitanic acid into sodium titanate by treatment under heat with sodium hydroxide, and in hydrolyzing under heat the sodium titanate to $TiO_2$ by the addition of hydrochloric acid.

The product thus obtained is then coated with $RuO_2$, as in the previously described method. In this instance, there is obtained a partially hydrated crystalline product of a rutile structure.

The catalyst of our invention may be used in the presence of a water-reducing catalyst consisting of colloidal platinum. The redox system may consist, for instance, of ruthenium trisbipyridyl and methylviologen. In this system, the catalyst, which may be represented by the formula: $TiO_2/Nb/RuO_2$, has a concentration comprised, for instance, between 100 mg/lt and 1 g/lt; the colloidal Pt has for instance a diameter of about 30 Å and, for instance, a concentration of about 40 mg/lt.

The ruthenium trisbipyridyl has a concentration comprised between, for instance, 1 and $3.10^{-4}$ mols/lt, while the methylviologen has a concentration of, for instance, about $5.10^{-3}$ mols/lt.

In this system as well as in the systems that will be described hereinafter, the pH of the dispersion is comprised between 3 and 7, but preferably is comprised between 3.8 and 5.

By this system, the yield in $H_2$ is very much higher than is obtained using $RuO_2$ as a catalyst instead of $TiO_2/Nb/RuO_2$, and it remains stable through time.

The catalyst of this invention may also be used in a system that contains colloidal Pt, ruthenium trisbipyridyl, methylviologen and EDTA.

In this system, the concentration of EDTA is, for instance, equal to $5.10^{-2}$ mols/lt, while the concentration of the other components is equal to the one previously defined. By this system only $H_2$ develops, with yields that are even better than those obtained using the catalyst $TiO_2/Nb/RuO_2$ in presence of ruthenium trisbipyridyl, methylviologen and the water-reducing catalyst consisting of colloidal platinum as described above.

The catalyst of this invention may likewise be used with a simplified redox system.

In fact we have found that a system consisting of $TiO_2/Nb/RuO_2$, ruthenium trisbipyridyl and colloidal Pt (that is, a system free of methyl viologen) is capable of producing $H_2$ and $O_2$.

The catalyst may also be used in the absence of a redox system. Thus, we have found that a system consisting of $TiO_2/Nb/RuO_2$ and colloidal Pt (i.e., free of ruthenium trisbipyridyl and methylviologen) is capable of producing $H_2$ and $O_2$ if, instead of sunlight, ultraviolet rays are used for the radiating.

It is presumed that the $RuO_2$, that is present on the surface of the $TiO_2$ particles, does not form a continuous coating; presumably there are spots (sites) of $RuO_2$ that cover only part of the particle surface.

It also appears that in the systems of photo-decomposition of water described hereinabove, the particles of colloidal Pt are adsorbed on the surface of the $TiO_2/Nb/RuO_2$ catalyst.

The following examples are given for the purpose of illustrating the invention in even more detail.

EXAMPLE 1

The process started from a sulphuric solution of $TiOSO_4$ and $Fe^{++}$, coming from the sulphuric digestion of ilmenite, containing 0.2% by weight of Nb (calculated as $Nb_2O_5$ with respect to the $TiO_2$), the niobium coming from the ilmenite mineral.

Said solution was heated up to between 95° and 100° C. and then diluted with water in a ratio of 20 parts by volume of water to 80 parts by volume of sulphuric solution, according to the Blumenfeld method.

At the end of the hydrolysis, 100 g of metatitanic acid (calculated as $TiO_2$) were added as an aqueous slurry in a concentration of 250 g/lt (as $TiO_2$), under stirring, to 200 ml of a 50% b.w. NaOH solution at a temperature of 90° C.

The slurry was kept under stirring for 2 hours at a temperature $\geq 90°$ C. and then, after dilution in a 1:1 volumetric ratio with distilled water, was filtered and washed until attaining a content in $Na_2O$ of the washing waters $<1$ g/lt.

To the thus obtained sodium titanate, dispersed in water in a concentration of 200 g/lt (as $TiO_2$), there was added a 30% b.w. HCl solution, in such a quantity that, after heating up to 60° C. under stirring, the pH was $3\pm0.1$.

To the slurry thus obtained was added further HCl in a 30% by weight concentration, the quantity of HCl being equivalent to a molar ratio of $HCl:TiO_2=0.9$. The ensuing slurry was thereupon heated at boiling temperature for 2 hours.

Once the reaction was completed, the slurry was diluted with distilled water until reaching a concentration of $TiO_2$ equal to 100 g/lt. The dispersion thus obtained consisted of particles of acicular $TiO_2$ of a rutile structure and having a particle size comprised between 1,000 and 2,000 Å.

To a quantity of slurry containing 1 g of $TiO_2$ there was then added 1 ml of $RuCl_3$ solution (0.2 g $RuCl_3 \cdot H_2O$/100 ml of $H_2O$).

The quantity of $RuCl_3$ was such as to yield 0.1% of $RuO_2$ with respect to $TiO_2$. The dispersion thus obtained was homogenized in a supersonic bath for about 1 minute, and then dried under a vacuum of about 300 mmHg at 50° C. overnight.

The use of the catalyst for the decomposition of water by the action of sunlight is described in the following.

An aqueous dispersion of finely comminuted Pt (with a particle diameter of about 30 Å) was admixed to an aqueous dispersion of the catalyst. To the dispersion thus obtained were then added, under constant stirring, ruthenium trisbipyridyl chloride and methylviologen.

The pH was adjusted to the value 4.7. In the resulting dispersion the following concentrations were found:
Pt=40 mg/lt
$TiO_2/Nb/RuO_2$=500 mg/lt ruthenium trisbipyridyl chloride: $1.10^{-4}$ mol/lt methylviologen: $5.10^{-3}$ mols/lt.

25 ml of the dispersion were placed into a 35 ml glass flask having two optically flat windows and provided with a stirrer. The dispersion was treated with a current of nitrogen in order to eliminate the air. For the illumination of the sample with visible light, there was used a 450 watt Xenon lamp. The infrared and ultraviolet components were eliminated from the radiations emitted by the lamp by means of a waterfilled glass flask 15 cm thick and a filter retaining the radiations of wavelength below 400 nm.

During radiation, the dispersion was kept under stirring. The gas present in the flask was then analyzed to determine the concentrations of $H_2$ and $O_2$. There was observed a generation velocity of the hydrogen equal to 45 ml/hour per liter of solution and a generation velocity of the oxygen equal to 16 ml/hour per liter of solution.

EXAMPLE 2

The following example illustrates the use of the catalyst of Example 1, in a system in which EDTA is oxidized, thus producing only hydrogen.

The dispersion used for the purpose is identical with that of Example 1, except for the presence of EDTA in a concentration of $5.10^{-2}$ mols/lt.

The dispersion was subjected to radiation with visible light, as described in Example 1.

There was found a generation velocity of the hydrogen of 300 ml/hour per liter of solution.

EXAMPLE 3

To a sulphuric solution of $TiOSO_4$ and $Fe^{2+}$ (coming from the sulphuric digestion of ilmenite) there was added $Nb_2O_5$ in such a quantity as to obtain 0.4% b.w. $Nb_2O_5$ with respect to the $TiO_2$ and was then heated up to between 95° and 100° C. and diluted with water in a ratio of 20 parts by volume of water for 80 parts by volume of sulphuric solution, according to the Blumenfeld method.

The metatitanic acid slurry thus obtained was filtered and washed in order to eliminate the soluble impurities.

To a quantity of concentrated slurry containing 1 g of $TiO_2$ there was added a solution containing 1 mg of $RuCl_3$ (calculated as $RuO_2$) so as to obtain 0.1% of $RuO_2$ with respect to the $TiO_2$ in the final product. The product was then dried under a vacuum of about 300 mmHg at about 110° C. overnight.

The $TiO_2$ was partially amorphous and showed a microcrystalline anatase structure. It was formed of aggregates of primary particles, the size of the aggregates being equal to 1,000-2,000 Å, while the diameter of the primary particles was comprised between 50 and 150 Å.

Thereupon, there was prepared a dispersion of the catalyst with colloidal Pt and ruthenium trisbipyridyl chloride (in the absence of methylviologen). The concentration of the components in the dispersion was:

Pt: 40 mg/lt
$TiO_2/Nb/RuO_2$: 500 mg/lt
ruthenium trisbipyridyl chloride: $2.10^{-4}$ mols/lt The pH of the dispersion was 4.5.

The dispersion was subjected to radiation with visible light as in Example 1.

It was found that even in the absence of methylviologen, the system develops $H_2$ and $O_2$.

EXAMPLE 4

There was prepared a dispersion of the catalyst described in Example 3 with colloidal Pt (in the absence of ruthenium trisbipyridyl and methylviologen).

The concentration of the components of the dispersion was as follows:

Pt=40 mg/lt
$TiO_2/Nb/RuO_2$=500 mg/lt.

The pH of the dispersion was 4.5.

The radiation was conducted with the same lamp as that used in Example 1, but in the absence of the filter which eliminates the radiations of a wavelength below 400 nm, so that the dispersion was also subjected to ultraviolet rays.

It was found that the system develops $H_2$ and $O_2$ although being free of the ruthenium trisbipyridyl and methylviologen redox system.

We claim:

1. Catalyst for the photodecomposition of water, characterized in that said catalyst consists of particles of $TiO_2$ doped with Nb, said particles containing $RuO_2$ on their surface.

2. Catalyst according to claim 1, characterized in that the quantity of niobium (expressed as $Nb_2O_5$) is comprised between 0.001% and 10% by weight with respect to the $TiO_2$ and the quantity of $RuO_2$ (expressed as $RuO_2$) is comprised between 0.001% and 10% by weight with respect to the $TiO_2$.

3. Catalyst according to either claim 1 or 2, characterized in that the particle size of the $TiO_2$ is comprised between 50 Å and 10 micron.

4. Process for the preparation of the catalyst of claim 1, characterized in that a soluble compound of pentavalent niobium is added to a solution of $TiOSO_4$ and $FeSO_4$ coming from the sulphuric digestion of ilmenite or other titaniferous materials, the solution is heated to a temperature comprised between 90° C. and the boiling temperature of the solution, diluted with water to obtain a metatitanic acid precipitate containing Nb, filtering and washing the resulting slurry, adding a solution of a water soluble ruthenium salt to the filtration cake, drying the product thus obtained, then heating said product in the air.

5. The process of claim 4, in which the heating in air is at temperatures comprised between 80° and 120° C.

6. The process of claim 4, in which the soluble compound of pentavalent niobium is $Nb_2O_5$.

7. The process of claim 4, in which the water soluble ruthenium salt is $RuCl_3$.

* * * * *